United States Patent [19]

Sticht

[11] Patent Number: 4,890,715
[45] Date of Patent: Jan. 2, 1990

[54] METHOD OF AND A DEVICE FOR CODING WORKPIECE CARRIERS IN A PRODUCTION PLANT

[76] Inventor: Walter Sticht, Karl-Heinrich-Waggerl-Strasse 8, A-4800 Attnang-Puchheim, Austria

[21] Appl. No.: 11,059

[22] Filed: Feb. 4, 1987

Related U.S. Application Data

[63] Continuation-in-part of Ser. No. 695,838, Jan. 28, 1985, abandoned.

[30] Foreign Application Priority Data

Feb. 6, 1984 [AT] Austria ................................. 363/84
Feb. 6, 1984 [AT] Austria ................................. 361/84

[51] Int. Cl.⁴ .............................................. B65G 43/00
[52] U.S. Cl. ...................................... 198/340; 198/866; 198/349; 104/88; 414/222; 414/786; 29/791; 29/430
[58] Field of Search ................ 414/222, 786; 198/341, 198/350, 340, 349.5, 349.8, 349.9, 349; 104/88; 29/791, 430

[56] References Cited

U.S. PATENT DOCUMENTS

| 2,751,090 | 6/1956 | Gourdon | 414/134 |
| 2,919,790 | 1/1960 | Winz et al. | 414/134 X |
| 3,175,675 | 3/1965 | Sgriccia et al | 104/88 X |
| 3,250,377 | 5/1966 | Minichello et al. | 414/134 X |
| 3,403,634 | 10/1968 | Crowder | 104/88 X |
| 3,576,540 | 4/1971 | Fair et al. | 414/134 X |
| 3,602,359 | 8/1971 | Miya et al. | 198/350 |
| 3,605,627 | 9/1971 | Homeier et al. | 104/88 |
| 3,661,089 | 5/1972 | Soltz | 104/88 |
| 3,722,425 | 3/1973 | Allen | 414/134 X |
| 4,056,063 | 11/1977 | Ritter | 104/88 |

Primary Examiner—Frank E. Werner
Attorney, Agent, or Firm—Kurt Kelman

[57] ABSTRACT

Workpiece carriers are fed to successive work stations along conveyor tracks at which stations work operations are performed on individual parts on the carrier and in which a defect signal is allocated when appropriate. After a work operation has been performed a coding member is left in a normal switching position corresponding to a defect coding or displaced into a switching position corresponding to an accept coding if the work operations performed were satisfactory. In a coding device displaceable coding elements are supported by a workpiece carrier and traverse a detector device at the work processing station and a switching element for displacing the coding element from a reject coding switch position to an accept coding switch position. Advantageously an accept coding is only secured by a deliberate action when satisfactory work processing has been completed and thus subsequent processing of defective parts is avoided simply and with great reliability.

9 Claims, 3 Drawing Sheets

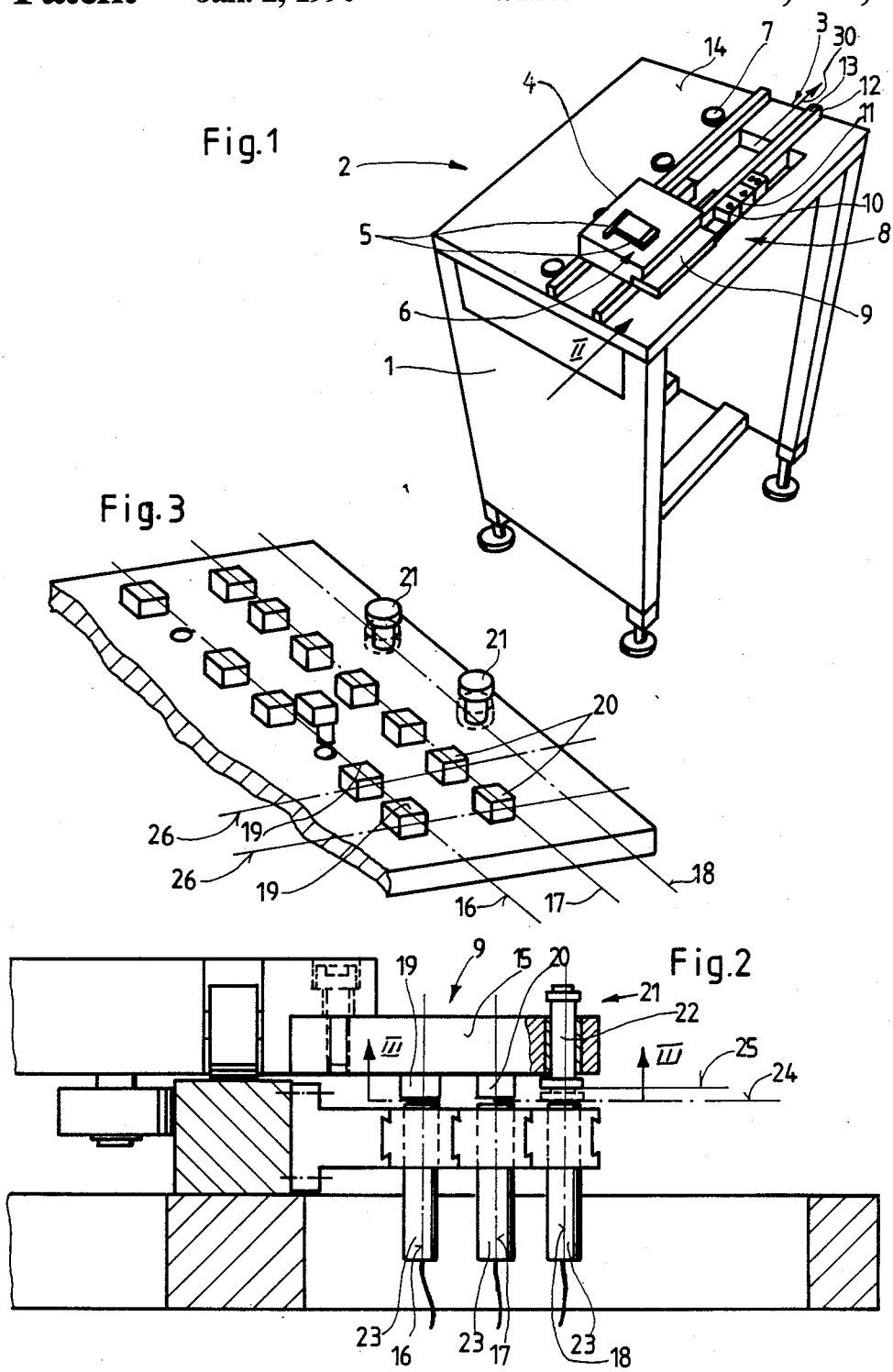

METHOD OF AND A DEVICE FOR CODING WORKPIECE CARRIERS IN A PRODUCTION PLANT

CROSS-REFERENCE TO RELATED APPLICATION

This is a continuation-in-part of my copending U.S. patent application Ser. No. 695,838, filed Jan. 28, 1985, now abandoned.

BACKGROUND OF INVENTION

1. Field of Invention

The invention relates to a method and a device for the coding of workpiece carriers in production plants, in particular for the assembly of workpieces comprising several separate parts, in which the workpiece carriers are fed along conveying tracks to different successive operating or processing stations in which separate parts are added or fitted to or processed and wherein an error signal is allocated to a workpiece carrier receiving such workpieces in case of faulty assembling or processing so that these workpieces are no longer processed in the following working or processing stations but are supplied to a delivery point for scrap parts or for further processing.

2. Description of Prior Art

Different coding devices for workpiece carriers in production plants are already known. Devices of this kind commonly comprise signal carriers arranged on the workpiece carrier, e.g. pivotable or displaceable pins or bolts or the like. These signal carriers are frequently utilised only so that when the workpiece is processed defectively on a workpiece carrier, the same may be tagged as a scrap or waste workpiece. This is accomplished by displacing the signal carriers from the so-called good position into the scrap or waste position by means of displacing means situated in the individual working or processing stations. Coding devices of this nature are occasionally also utilised for coding devised to perform different individual working operations on the workpieces of the workpiece carriers. These systems are not applicable in all cases however, since the displaceable parts require constant maintenance and the investment and space required for such devices is great, and since the further processing of the data obtained, especially by means of electronic control means, involves a substantial expenditure.

OBJECTS AND SUMMARY OF THE INVENTION

The present invention has as its fundamental object to devise a method and a device for characterising workpiece carriers for production plants and in particular for fully automatic production plants, where the coding element or signal carrier is situated on the workpiece carrier. Furthermore, it is an object in a simple manner to provide for discrimination between satisfactory and defective conditions of the individual workpieces, or of individual parts situated on the workpiece carriers, and to allow the coding element to be utilisable for positioning the individual workpiece or workpiece carrier.

According to the method of the invention, the workpiece carriers fed to successive work processing stations along conveyor tracks, at which stations the work operations on individual parts on the carriers are effected, have arranged thereon a displaceable coding element in a first switching position indicating a defect signal so that such workpieces on the carriers are no longer processed in subsequent work processing stations or are fed to a delivery station for scrap parts or post-processing in the case of a defective work operation, and the coding element is displaced into a switching position corresponding to an accept coding if the processing operations were performed in due form in the work processing station.

The coding element is allowed to remain in a switching position corresponding to reject coding in a working or processing station after an individual part has been supplied, fitted or processed therein, if a defective infeed, fitting or processing operation has occurred, and is displaced to a switching position indicating an accept coding if the processing operations had been duly performed in the working or processing station. The advantages of this unexpectedly uncomplicated solution consist in that, since the workpiece carriers have coding elements in a switching position corresponding to reject coding, an accept coding may be secured only by a deliberate operational step and that no further processing operation on faulty parts can be performed.

In accordance with a further feature of the method, the switching position of the coding element is detected prior to infeed, fitting or processing of an individual part in a subsequent working or processing station, and if the switching position of the coding element corresponds to a reject coding, the individual parts or workpiece carriers are not processed in the working or processing station while in the case of a switching position of the coding element corresponding to an accept coding, the element is displaced into a switching position establishing a reject coding of the individual part of workpiece, from which it is displaced into a switching position establishing an accept coding if the processing and/or assembling operation is duly performed. Thanks to the initial "reject coding" of each workpiece carrier, it is assured that, in case of a breakdown of the control system, even properly assembled or processed parts are tagged as being defective but in no case will defective parts be tagged as being proper. For this reason, this method also offers a high degree of safety and is primarily appropriate for the production or processing of safety elements.

The invention includes a device for characterising individual parts or workpiece carriers in a production plant comprising several working or processing or storing stations successively arranged in the conveying direction along a conveyor track, and a coding element allocated to each workpiece carrier, as well as detector or coder devices arranged along the conveyor track, which are coupled to a control device for this production plant for implementation of the method, by means of which it is possible to apply the method in accordance with the invention.

This device is characterised in that each workpiece carrier has allocated to it a displaceable coding element supported by the carrier which has switching positions indicating an accept coding or a reject coding, and which at a work processing station comprises a detector device, a switching element for displacing the coding member from the accept coding switching position into the reject coding switching position, and a coding device comprising a switching element for displacing the coding element from a reject coding switching position into an accept coding switching position. Thanks to the separation of the device into individual modular components, it is possible to establish a space-saving pattern in the area close to the workpiece carrier and to the conveyor track, and the device may simply be reset to different processing positions, in particular in the case of workpiece carriers comprising several reception means for individual parts.

According to another and very essential feature of the invention, the coding element is a signal pin installed in a holder and displaceable at right angles to the travel direction of the workpiece carrier, which has securing means allocated to it in the two switching positions, whereby it is assured that no accidental spontaneous displacement of the signal pin is possible during the travel of the workpiece carriers from one working or processing station to the next.

It is also possible furthermore for the holder for the signal pin to be secured on a support bar situated on a lateral edge of a workpiece carrier and comprising bores situated one behind the other at predetermined intervals, and for the signal pin to be aligned at right angles to the conveying plane of the conveyor track, and for the coding device, the scan or detector device and the switching element to be displaceably installed on a mounting bar which is equipped with several fastening bores arranged one behind another with mutual spacing and secured on the guiding bars of the conveyor track. Thanks to the incorporation of a support bar for the holder of the signal pin on the workpiece carrier, its position may be adapted in an uncomplicated manner to different conditions, or in other words, each workpiece carrier may be equipped as standard with appropriate support bars and the holder for the signal pins and the like may then be installed at the position required in each case, in a versatile manner.

A form of embodiment is also advantageous in which the switching element post-connected to the scan or detector device is formed by a switching member comprising a switching slide or the like for the signal pin, and the switching element of the coding device is constructed as a displaceable piston-cylinder system, since the signal pin allocated to an individual part is displaced to the switching position corresponding to the reject coding by means of the switching slide prior to the processing of the individual part.

Furthermore, it is also possible for the switching element and the coding device to have installed between them another detector device which corresponds to a working or processing point of the individual part situated on the workpiece carrier. The signal carrier may thereby advantageously be utilised at the same time for positioning an individual part situated on the workpiece carrier, so that the latter may be held precisely in position at a working or processing station.

It is also advantageous for the support bar of the workpiece carrier to have installed on it several successively positioned coding elements in the direction of travel, which are in each case allocated to one of the workpieces arranged on the workpiece carrier. Thanks to the small space requirement of the coding elements according to the invention, it is possible to allocate the coding elements with the closest possible correspondence to the workpieces, even if the latter are small.

It is finally also possible within the scope of the invention that the holder for the coding elements may comprise several rows of signal carriers extending parallel to the direction of travel, which with respect to the surface of the signal carrier plate in particular are protruding and/or displaceable with respect to the frame as well as arranged spaced apart in the direction of travel, and for detector elements allocated to the separate rows of signal carriers to be situated in the scan or coding device. A plurality of different data regarding the workpiece carrier or the workpieces or individual parts arranged thereon may thereby be communicated to the detector elements in the separate working or processing stations, a precise monitoring operation in respect of the different working processes being possible thereby.

BRIEF DESCRIPTION OF THE DRAWINGS

The invention will now be described, by way of example, with reference to the accompanying partly diagrammatic drawings, in which:

FIG. 1 is a perspective view from above of a machine table of a production plant and comprising a coding device according to the invention, for characterising individual parts or workpiece carriers, which is situated in the working area of a processing station for cooperation with the workpiece carriers, FIG. 2 is an end view partly in section of the coding device illustrated diagrammatically in FIG. 1, FIG. 3 is an inverted fragmentary view of part of a signal carrier plate comprising several rows of signal carriers extending side-by-side parallel to a direction of travel, and forming several scanning rows extending transversely to the direction of travel, in a diagrammatical form of illustration, generally viewed along lines III—III in FIG. 2.

DETAILED DESCRIPTION OF THE PREFERRED EMBODIMENTS

Figure 4:
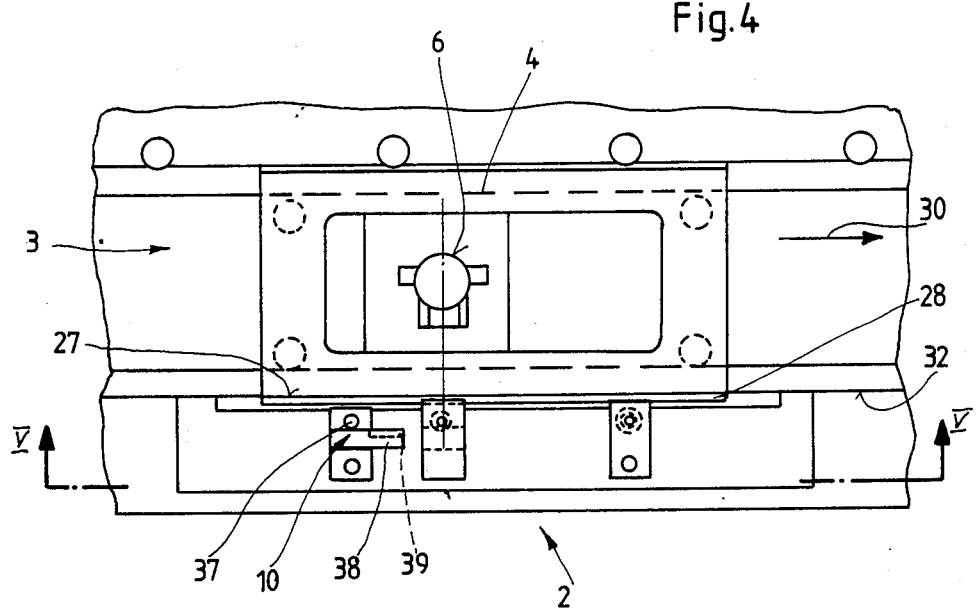
FIG. 4 is a plan view of a working or processing station incorporating the components of a coding device in accordance with a further embodiment of the invention for characterising individual parts.

A machine table 1 of a work processing station 2 of a production plant is illustrated in FIG. 1. The work processing station 2 comprises a conveyor track 3 for workpiece carriers 4 with individual parts 5 arranged on the carriers 4, which parts may form a workpiece 6. These individual parts 5 may be processed, supplied, fitted or worked in some other optional manner in the work processing station 2. The separate actions described in the foregoing may be performed manually or in a fully automatic or semi-automatic manner. The workpiece carriers 4 are associated with friction roller drives 7 to convey them along the conveyor track 3. A coding device for characterising workpiece carriers 4, which is denoted generally by the numeral 8, is incorporated for monitoring the displacement of the workpiece carriers or the implementation of the work processing operations on the individual parts 5. The coding method and installation used in the coding system of the present invention is based on that disclosed in my copending U.S. Pat. No. 4,591,991, which will be explained in detail hereinafter in connection with FIG. 6, which corresponds to FIG. 1 of the copending patent. The coding device 8 for characterising workpiece carriers 4 incorporates a coding element 9 mounted on the carriage 4 (as shown in FIG. 4 of copending patent). A scan or detector device 10, a switching element 11 and a coding device 12 are arranged partially recessed in a table plate 14 beside the guiding bar 13 of the conveyor track 3, below the path of travel of the coding element 9.

An embodiment of a coding element 9 is illustrated in FIGS. 2 and 3. This coding element 9 comprises several signal carriers 19 to 21 which are arranged, as seen in FIG. 3, side-by-side in several rows 16, 17 and 18 extending in the direction of travel on a signal carrier plate 15. The signal carriers 19 and 20 are fixedly installed on the signal carrier plate 15, whereas each signal carrier 21 in the row 18 is formed by a signal pin 22 which is vertically displaceable with respect to the signal carrier plate 15. Detector or sensor elements 23 forming parts of detector device 10 and by means of which it is possible to detect the position of the protruding signal carriers 19 and 20 or of the displaceable signal pin 22, are associated with respective rows of the signal carriers 19 to 21. The different positions of each signal pin 22 are detected in the row 18 by means of the sensor element 23 in the following manner: sensor element 23 is constructed as an electromagnetic proximity switch which generates an electromagnetic field when the signal pin 22 is in the lower dash-dotted position 24, whereas the sensor element 23 is not activated in the position 25 shown by solid lines.

It is more clearly apparent from FIG. 3 that several signal carriers 19, 20 and 21 in the rows 16 to 18 are associated in transverse scanning rows 26. The signal carriers arranged one behind another in rows 16 and 17 may serve the purpose of establishing a code number formed by a binary numeric combination for the workpiece carrier 4, whereas the signal carriers situated in the row 18 for example may be utilised for generating a continuous timing pulse. The signal carriers 21 may for example be allocated to two workpieces 6 spaced one behind another on the workpiece carrier 4, for the purpose of characterising the momentary processing condition accept/reject of these and furthermore of positioning the workpieces 6 successively in the processing position.

Figure 5:
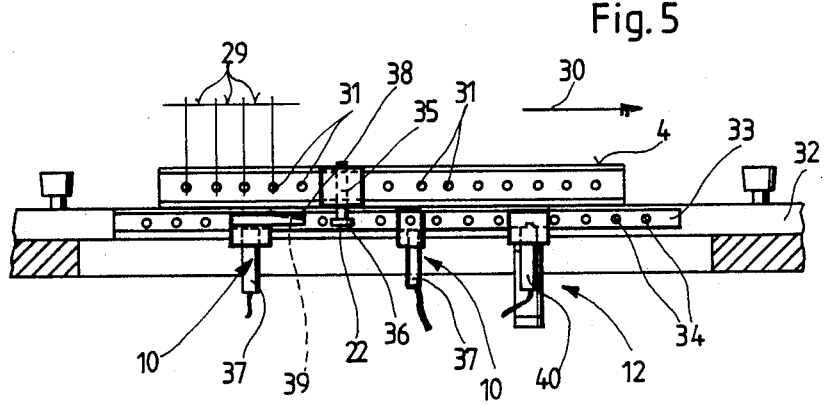
FIG. 5 is a partly sectional side elevation of the coding device taken along the lines V—V in FIG. 4.

A modified embodiment of a device in accordance with the invention, intended to characterise a workpiece carrier 4 or the workpiece 6 situated thereon, is illustrated in FIG. 4. On one lateral edge 27 of the workpiece carrier 4 is secured a support bar 28 in which several bores 31 are formed at predetermined intervals 29 in the direction of travel—arrow 30—as shown in FIG. 5. An assembling bar 33 which is equipped with fastening bores 34, equally at predetermined intervals, for example but not necessarily at the same intervals 29 as on the support bar 28, is situated on a lateral edge 32 of the guiding bar 13 facing away from the workpiece 6. A holder 35, in which is situated a displaceable signal pin 22, is secured in a bore 31 of the support bar 28. This signal pin 22 has a lower switching stud 36. As more clearly apparent from FIG. 4, the signal pin 22 is aligned transversely of the conveying direction 30 on a central axis—dash-dotted line—of the workpiece 6.

This signal pin 22 is associated with a first detector device 10 which comprises a sensor element 37. This sensor element 37 has allocated to it a switching element 38 comprising an oblique switching slide 39 inclined forwardly and downwardly in the direction of travel with respect to the workpiece carrier 4. Another detector device 10 comprising a sensor element 37 is arranged forwardly in the direction of travel 30 from the first device 10 and is associated with a predetermined processing station for the central axis of the workpiece 6.

The further detector device 10 is followed by a coding device 12 incorporating a switching element 40 formed by a piston-cylinder system comprising a switching member extendable in the direction of the workpiece carrier 4.

When workpiece carrier 4 is moved along the conveyor track 3 in the direction of travel, the position of the signal pin 22 is detected after arrival in the working or processing station 2. If the pin 22 is situated in the lower switching position shown by solid lines in FIG. 5 and corresponding to a reject coding, the workpiece carrier 4 travels through the working or processing station 2, preferably without stopping at the same. If, on the contrary, the switching pin 22 is situated at the upper switching position, meaning the accept coding position, when it is moved past the detector device 37, which may be an electromagnetic proximity switch or a reflected light sensor, a Hall generator or the like, this does not cause any signal state alteration at the output of the detector element 37 and the detector device 10 allocated to the processing position is activated. At the same time, upon advancing the workpiece carrier 4 in the conveying direction, the sloping switching slide 39 engages switching stud 36 and causes the signal pin 22 to be lowered into the switching position indicating a reject coding from the switching position indicating an accept coding. The switching stud 36 is thereby moved within the range of action of the sensor element 37 and the workpiece carrier may be arrested and positioned upon reaching the second detector device 10, to perform a working or processing operation.

After completion of the processing operation, the workpiece carrier 4 continues to move in the direction of a coding device 12. If the preceding working or processing operation had been performed properly, the piston-cylinder drive forming the switching element 40 is extended when the switching pin 22 is being moved past this coding device 12, and the signal pin 22 is displaced upwards into the upper switching position—into the accept coding position—shown by solid lines in FIG. 2.

If, by contrast, the working or processing operation had not been implemented in due form, the coding device 12 is not activated and the workpiece carrier 4 moves past the coding device 12 without the switching pin 22 being displaced in the holder 35. The workpiece carrier 4 is thereby detected as being a waste scrap component in the working or processing station, and no longer processed or fed to a post-processing station.

Figure 2A:
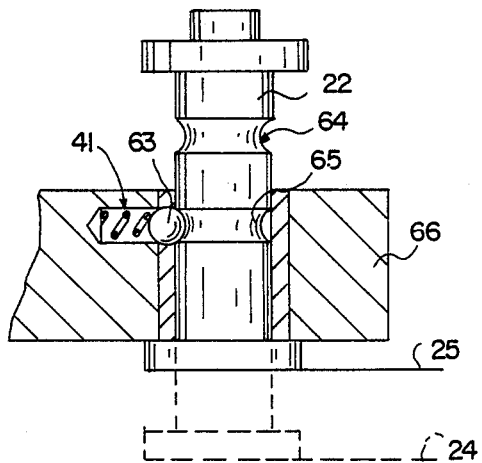
FIG. 2A is a fragmentary, enlarged cross section showing a structural detail.

As shown in FIG. 2A, the retention of the signal pin 22 in the switching positions 24, 25 is suitably performed by means of securing devices 41 formed by spherical thrust members 63, for which purpose the signal pins 22 have grooves 64, 65 machined in them at the two extreme positions 24, 25, with balls 63 spring-loaded within the holder 66 engaging in the grooves in the respective switching positions.

It will be apparent that various changes may be made in the form, construction and arrangement of the parts described without departing from the spirit and scope of the invention.

Figure 6:
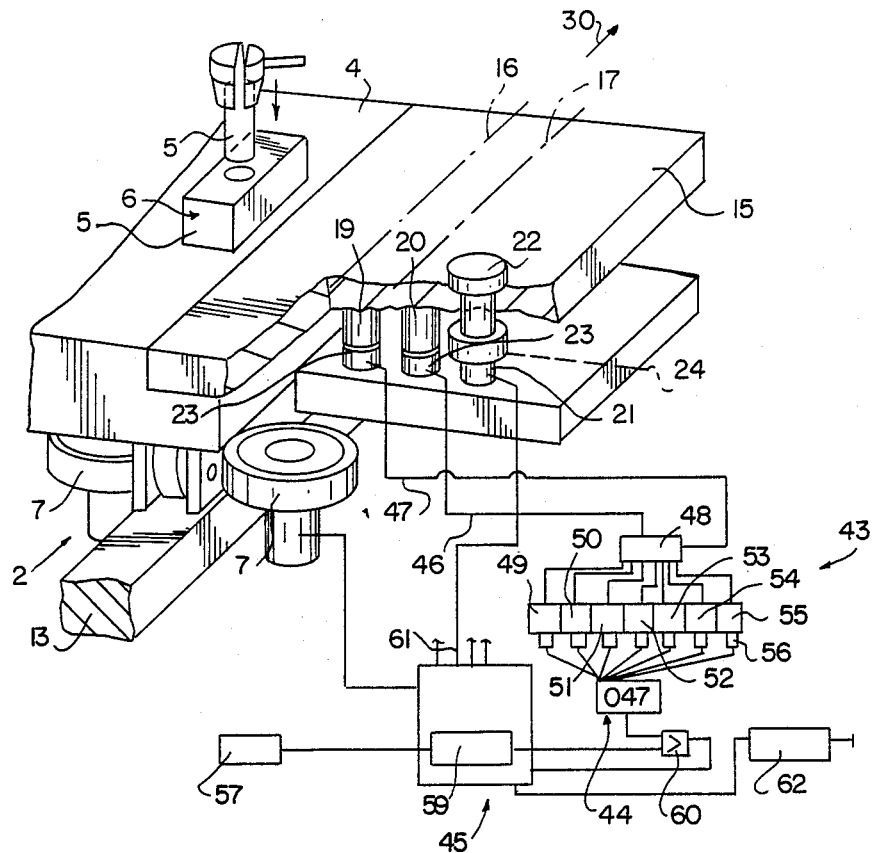
FIG. 6 is a simplified perspective view showing a generally known coding system for coding workpiece carriers according to the present invention.

Referring to FIG. 6, the coding method and installation of the present invention is illustrated in connection with pallet 4 on which a plurality of parts 5 are assembled by a manipulating device to form a workpiece 6 at work or processing station 2. The pallet 4 is moved along an assembly line conveying path in conveying direction 30 to successive work stations where the parts are processed or assembled. Pallet 4 is vertically guided in the conveying path by guide rollers running on guide ledges 13 while the pallet 4 is laterally guided in the conveying path by pairs of rollers 7, 7 rotatable about a vertical axis, one of the rollers of each pair being driven to constitute means for moving the pallet in the conveying path. Preferably, the driven roller is coupled to a drive motor through a slip clutch. Rollers 7, 7 frictionally engage sides of pallet 4 and the resultant friction force causes the pallet to be entrained by the driven roller.

Pallet 4 is encoded to generate a signal indicating a defect in the workpiece on the pallet in a respective work station for excluding the defective workpiece from work in work stations subsequent thereto. For this purpose, a signal carrier device is arranged on pallet 4. The pallet 4 has an upper side supporting workpiece 6 or workpieces and an underside parallel thereto. The signal carrier device comprises support plate 15 extending in a plane parallel to the pallet underside and signal carriers 19 to 21 are arranged on the side of the support plate facing away from the upper side of the pallet. This arrangement will prevent clogging the signal carriers with dirt, such as lubricants, dust, metal chips or the like, or damaging them by falling workpiece parts so that false signals will be obviated.

The signal carrier device has an array of a plurality of signal carriers 19, 20 in adjacent rows 16, 17 extending in conveying direction 30, the signal carriers being spaced from each other in this direction in rows extending perpendicularly to adjacent rows 16, 17 for enabling the signals in the perpendicular rows to be sensed simultaneously. Row 17 provides a respective signal carrier 20 in each perpendicular row while signal carrier 19 is positioned in row 16. The structure and operations of signal pin 22 has been described in connection with FIGS. 2 to 5.

Signal scan or detector device 10 is arranged at work station 2 along the conveying path and faces a pallet side for receiving the generated signals from the signal carriers in the perpendicular rows and emitting corresponding control signals. This comprises sensing means 23 associated with the signal carriers in perpendicular rows, this sensing means being constituted by sensors spaced from each other in registry with adjacent rows 16, 17 of the signal carriers. In this manner, the sensors will sense the presence of signal carriers in row 16 as well as the signal carriers in adjacent row 17.

The illustrated signal carriers are metal faces mounted on, and projecting from, support plate 15 towards scan or detector device 10, and the sensors are electromagnetic proximity fuses, also known as pulsors, associated with adjacent rows 16, 17 of signal carriers for sensing the metal plates. This arrangement has the advantage that standard sensors may be used, which are effective without problem in areas clogged with dirt, as they occur in assembly lines.

A characteristic number in the binary digital code is associated with each signal carrier in adjacent row 17 and the sensed signals of all signal carriers in row 17 as well as the sensed signals from any additional signal carriers in adjacent row 17 are transmitted to slide register 43 for step-by-step operation thereof. A signal corresponding to the binary sum totaled in slide register 43 is transmitted to counter 44 after the signals of last perpendicular row have been sensed, and the signal is then transmitted from the counter to memory 45 where the transmitted characteristic signal is stored. As pallet 4 is conveyed in work station 2 into a position wherein the signal carrier device faces the signal scan or detector device 10, metal faces of any signal carriers present in rows 16, 17 will sequentially operate proximity fuses to generate signals at output 46 of the fuse and, where signal carriers are present in row 16, at output 47 of the fuse. Outputs 46 are connected to drive 48 operating slide register 43 to transmit the output signals to the slide register drive. Since signal carriers 20 are equidistantly spaced along row 17 in perpendicular rows, a timing pulse is transmitted to slide register drive 48 from output 46 of the sensor at a regular interval. The timing pulse causes output 47 of the sensor to be connected selectively with a respective one of seven sequentially arranged individual registers 49 to 55 of slide register 43 which store the number of signal carriers sensed in perpendicular rows and generate corresponding output signals. After all the perpendicular rows have been sensed as pallet 4 passes in conveying direction 30, individual registers 50 to 53 and 55 will have stored therein signals from the signal carriers arranged along row 16 in perpendicular rows, individual register 54 receiving no signal since there is no signal carrier along row 16 in one perpendicular row. Multiplication member 56 is arranged to receive the output signals from the individual registers and counter 44 is connected to the multiplication member for indicating a characteristic signal of the carrier, which is the binary sum totaled in the counter.

Since the leading perpendicular row of signal carriers has a signal carrier in each adjacent row 16, 17, the exact beginning of the entire sensing process will be effectively determined and faulty signal transmissions will be avoided. Signal carriers are provided only in some of the perpendicular rows along row 16 and the array of signal carriers on support plate 15 is sensed to produce signal 63 characteristic of pallet 4. After the work has been properly completed at work station 2, the characteristic signal is transmitted to a subsequent work station. In this manner, each pallet is characterized by its own code and may be followed along the entire assembly line for proper monitoring, the codes indicating desired information about the state of the workpiece on the pallet, the course of the assembly procedure, tolerances, test results, etc. Only those pallets conveyed in the conveying direction whose characteristic signal corresponds to the stored characteristic signal may then be stopped, held in fixed position and worked on at a subsequent station to which the characteristic signal has been transmitted. If the signal carriers are associated with a binary code, a relatively small number of signal carriers can produce a large number of different characteristic pallet signals. Also, this enables the signal scan or detector device to be relatively simply structured and to process the generated information simply and very fast. With the equidistant spacing of the signal carriers in the conveying direction, variations in the conveyor speed will not unfavorably influence the result of the sensing of the signal carriers. The specific arrangement of the signal scan or detector device assures a timed reception of the information from the signal carrier device and enables the information to be processed in a great variety of ways by means of known circuits, including slide registers, microprocessors and the like.

Means 45 controlling pallet moving means 7 is arranged at work station 2 and comprises memory 59 storing the characteristic signal of pallet 4 received from counter 57 of a preceding work station where work on the pallet has been properly completed. As shown, the output of counter 44 is connected to comparator 60 and the comparator has one output connected to memory 59 while another output thereof is connected to pallet moving controlling means. Signal 63 obtained from the signal carrier device on pallet 4 at work station 2 is compared in comparator 60 with the signal stored in memory 59 to ascertain whether it is the same as the stored signal, or not. If it is the same, the pallet is stopped in work station 2, held in a fixed position and worked on by operating manipulating device to assemble part 5 on workpiece 6. For this purpose, control 45 has signal inputs and outputs 61 for controlling and monitoring means for stopping and holding pallet 4 in a fixed position and for working thereon. After the work has been properly completed, characteristic signal 63 is transmitted by control 58 to memory 62 of a subsequent similarly equipped work station where it is stored and used in the same manner as hereinabove described in connection with memory 59. With this arrangement, it is possible to exclude carriers with defective workpieces from work in a subsequent work station without providing special "defect" codes and changing the characteristic signal because the pallet moving means is responsive to control 45. If the signal stored in memory 59 does not match signal, pallet 4 will not be stopped in the work station so that any defective workpiece thereon will be excluded from work and the pallet will be moved on, for example to a repair station or to a storage station for defective parts.

Any number of rows may be used in the signal carrier array and, if desired, adjustable signal carrier or carriers may be arranged in a separate adjacent row extending in the conveying direction so that the signal indicating defective or proper work is given at each work station and need not be transmitted from control 45 to the subsequent station.

It is advantageous if a mechanically fixed element 39—FIGS. 4 and 5—is associated with sensor 21 for adjusting signal carrier pin 22 into operative (reject coding) switching position 24 before work begins. If a coding device for adjusting the signal carrier is arranged at the work station in the range of the stopping position of the pallet during the work, it can adjust the signal carrier into inoperative (accept coding) switching position 25 after the work has been properly completed. In this way, if the control fails, at worst every pallet 4 will be coded "defective" even if the work has been properly completed at the station 2. But no defective pallet 4 can be coded as "proper" for further work. The output of control 45 will be connected not with memory 62 of the preceding station but will actuate drive 40 (see FIGS. 4 and 5).

What is claimed is:

1. An apparatus for coding workpiece carriers supporting assembly parts and fed to successive work processing stations arranged in a conveying direction along a conveyor track, at which stations the assembly parts are processed in a processing position, which comprises a displaceable coding element arranged on each one of the workpiece carriers in an initial switching position corresponding to a reject coding and displaceable to another switching position corresponding to an accept coding, a detector device preceding the processing position in the conveying direction at each one of the work processing stations for detecting the switching position of the coding element on a respective one of the workpiece carriers at said station, a switching element succeeding the detector device for displacing the coding element from the reject to the accept switching position, and a coding device succeeding the processing position in the conveying direction, the coding device comprising a switching element for displacing the coding element from the accept to the reject switching position, control means for activating said switching element if processing has been acceptably performed, whereby if processing has not been acceptably performed at a work processing station, the assembly parts on the workpiece carrier are no longer processed when fed to successive work processing stations or are fed to a delivery station for scrap parts or post processing.

2. The coding apparatus of claim 1, wherein the coding element is a signal pin, and further comprising a holder for the signal pin, the signal pin being displaceable in the holder in a direction extending perpendicularly to the conveying direction between the initial and the other switching positions, and means for releasably retaining the signal pin in the holder in each one of the switching positions.

3. The coding apparatus of claim 2, wherein the conveyor track has a guide bar extending in the conveying direction and the workpiece carrier has a lateral edge adjacent the conveyor track guide bar, and further comprising a support bar arranged on the lateral carrier edge, the support bar defining a succession of bores spaced at predetermined intervals in the conveying direction, a respective one of the signal pin holders being mounted in a respective one of the bores, and an assembling bar secured on the guide bar and defining a succession of bores spaced at said intervals in the conveying direction, the detector and coding devices being detachably fastened in the bores of the assembling bar.

4. The coding apparatus of claim 1, wherein the switching element succeeding the detector device comprises a switching slide for engagement with, and displacement of, the coding element, and the switching element of the coding device is a piston-cylinder device.

5. The coding apparatus of claim 1, further comprising a further detector device disposed between the switching element succeeding the detector device and the coding device at a position corresponding to the processing position.

6. The coding apparatus of claim 1, wherein a succession of said coding elements are disposed at predetermined intervals in the conveying direction, the intervals of the coding elements corresponding to respective one of the processing positions.

7. The coding apparatus of claim 6, wherein the coding elements are arranged in a plurality of rows extending parallel to the conveying direction and protrude from the workpiece carrier, and the detector and coding devices comprise sensor elements associated with respective ones of the coding elements.

8. The coding apparatus of claim 7, wherein respective ones of the coding elements in the parallel rows extend in rows extending transversely to the conveying direction.

9. A method for coding workpiece carriers supporting assembly parts and fed to successive work processing stations along a conveyor track, each one of the workpiece carriers having a coding element displaceable between a first switching position corresponding to an accept coding and a second switching position corresponding to a reject coding, which comprises the steps of initially feeding each workpiece carrier to a first one of the work processing stations with the coding element displaced into the first switching position, detecting the switching position at the first work processing station and displacing the coding element into the second switching position, performing processing at said station, monitoring said processing and displacing the coding element back to the first switching position if processing has been acceptably performed at the first work processing station while, if processing has not been acceptably performed, maintaining it in the second switching position, feeding the workpiece carrier to a succeeding work processing station, detecting the switching position at the succeeding work processing station and performing processing at the succeeding station only if the coding element is in the first switching position, displacing the coding element into the second switching position at the station where processing is performed, and displacing the coding element back to the first switching position after processing has been acceptably performed at the succeeding work processing station, whereby if processing has not been acceptably performed at a work processing station, the assembly parts on the workpiece carrier are no longer processed when fed to successive work processing stations or are fed to a delivery station for scrap parts or post processing.

* * * * *